Figure 1:
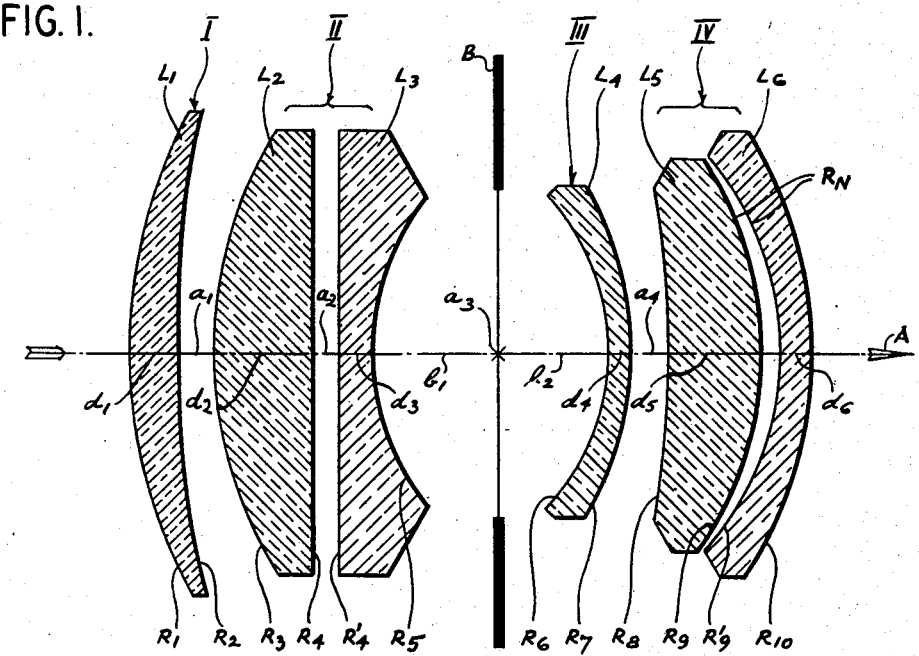

May 11, 1954     A. W. TRONNIER     2,677,989
FOUR-COMPONENT OBJECTIVE OF THE MODIFIED GAUSS-TYPE

Filed May 17, 1952

INVENTOR.
ALBRECHT WILHELM TRONNIER
BY
ATTORNEYS

Patented May 11, 1954

2,677,989

UNITED STATES PATENT OFFICE 2,677,989

FOUR-COMPONENT OBJECTIVE OF THE MODIFIED GAUSS-TYPE

Albrecht Wilhelm Tronnier, Gottingen, Germany, assignor to Voigtländer A. G., Braunschweig, Germany, a corporation of Germany Application May 17, 1952, Serial No. 288,462

Claims priority, application Germany February 2, 1952

6 Claims. (Cl. 88—57)

This invention relates to a new and improved objective of great light-transmitting capacity and anastigmatic image flatness of the modified Gauss-type. More particularly, the invention relates to a new and improved objective of said type, in which the diaphragm (B) is enclosed by two lens groups in such manner that in the front half, (I, II) of the objective, on the side of the longer conjugate, as well as in the rear half (III, IV) of the objective, on the side of the shorter conjugate, a simple, uncemented meniscus-shaped individual lens (I and III) is followed, in the direction of light from the object space to the image space, by a composite lens group (II and IV) of opposite power. In the objectives embodying the present invention, said meniscus-shaped individual lenses (I and III), of the front-half and rear-half, respectively, of the objective, are of opposite power and said composite lens groups (II and IV), consisting of lenses of opposite power, of the front half and rear half, respectively, of the objective, are likewise of opposite power; furthermore, said composite lens group IV of the rear half of the objective includes a collecting pair of strongly curved adjacent surfaces $R_N$ which is concave toward the diaphragm and preferably consists of a collecting cemented surface.

The main object of the present invention is to provide objectives of the above mentioned type, in which the hereinafter described specific combinations of design and structural and/or optical characteristics of the lenses forming part of the objective, are embodied in order to obtain improved photographic performance of the objective.

A further object of the invention consists in essentially reducing the zonal aberrations in the axial as well as in the non-axial parts of the image field of anastigmatic flatness.

Other objects and the advantages of this invention will be apparent from the appended drawings and claims and the following specification which describes, by way of example, some embodiments of my invention.

It has been found that by a correction of residual aberrations with particularly small zonal aberrations, the objectives embodying the present invention attain those characteristics which, even in the case of systems of high light-transmitting capacity, render it possible to define with a predetermined focal length, a field of vision in such manner that the diameter of the field within which the definition is of normal, satisfactory condition for reproductions, substantially corresponds to said focal length.

In objectives of the modified Gauss-type, embodying the present invention, the rear half of the objective on the side of the shorter conjugate, comprises two meniscus-shaped diverging lenses, which are concave toward the diaphragm, and said lenses enclose a collecting lens of unequal curvature, the most strongly curved surface of which is likewise concave toward the diaphragm. The pair of adjacent surfaces formed by the rear surface of said collecting lens and the front surface of the diverging last meniscus-shaped lens, has a strongly collecting equivalent refractive power, so that if the two lenses are cemented, the cemented surface has a collecting effect.

I have now found that the photographic performance of objectives of the above described type, can be substantially improved by meeting both of the following requirements: (a) the beforementioned collecting lens of unequal curvature, enclosed by the two meniscus-shaped lenses of the rear half of the objective, should consist of a glass, the refractive index of which for yellow light is higher than 1.6650; (b) the curvature of said collecting lens should be selected in such manner that the refractive power of its rear surface, which is concave toward the diaphragm and belongs to the beforementioned pair of adjacent surfaces $(R_N)$, amounts to 1.5 to 4.5 times the total refractive power of the complete objective, said surface refractive power being referred to the surrounding air on the one hand and to the yellow light of the helium spectrum on the other hand.

This refractive power referred to the adjacent air, measured in diopters, can be calculated from the known formula $$\varphi_j = \frac{1000.(n-1)}{R_j}$$

in which index $j$ denotes the order number of the surface, the radius $R_j$ of curvature of which is measured in mm.

In the enclosed drawings, Figure 1 is a vertical axial section of my new objective, taken along its optical axis. The horizontal optical axis is indicated by horizontal arrow A, which also indicates the direction of the light, from left to right. The object space is at the left of the objective, and the image space is at the right of the objective.

Figure 2:
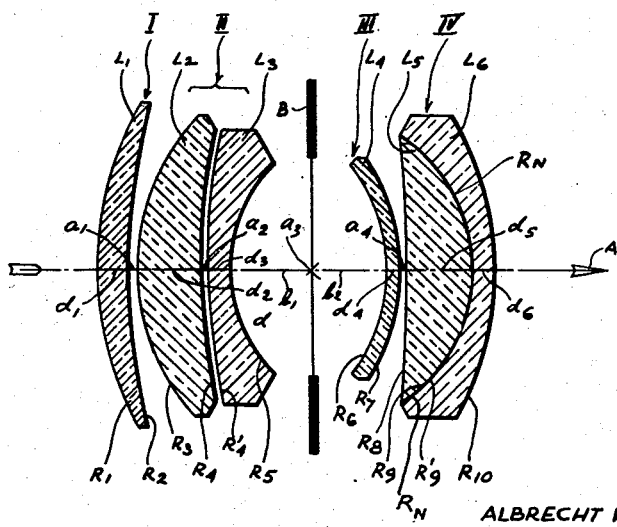

Figure 2 illustrates an embodiment of the invention for an equivalent focal length of f=150 mm., in natural size, the structure of which is proportional to the following numerical example.

In the following disclosure and drawings, certain symbols are used, which are identified as follows:

B is the diaphragm of the objective.

The lenses or lens groups forming the objective, are denoted I, II, III and IV. I is a meniscus-shaped individual lens and II a lens group arranged on the side of the major conjugate. III is a meniscus-shaped lens and IV a lens group, III and IV being located on the side of the minor conjugate.

The individual lens elements are denoted $L_1$, $L_2$, $L_3$, $L_4$, $L_5$ and $L_6$ from left to right.

The radii of curvature of the lens surfaces are denoted by reference symbols $R_1$, $R_2$, $R_3$, $R_4$, $R'_4$, $R_5$, $R_6$, $R_7$, $R_8$, $R_9$, $R'_9$, $R_{10}$; the axial thickness of the lenses by $d_1$, $d_2$ ... $d_6$; the axial thickness of the air spaces $a_1$, $a_2$, $a_3$, $a_4$; the radii of adjacent surfaces of the individual lenses in lens groups II and IV, are denoted $R_4$, $R'_4$ and $R_9$, $R'_9$, respectively.

$n_1$, $n_2$, $n_3$, $n_4$, $n_5$ and $n_6$ denote the mean indices of refraction for the yellow spectral line of helium light ($n_d$), of the individual lens elements of the objective, from left to right in the drawings, while the color dispersion of these lens elements is characterized by the numerical value of their Abbe number V.

$b_1$ and $b_2$ denote the axial distance of the diaphragm from the composite lens group (II) arranged on the side of the major conjugate and from the individual meniscus-shaped lens (III) arranged on the side of the minor conjugate, respectively. $R_N$ denotes a cemented surface formed by adjacent surfaces of the lenses of group (IV).

The data of the numerical example are based on a focal length of $f=100$, and, therefore, the lengths of radii, the axial thickness of the lenses and the axial thickness of the air spaces are stated in mm. As an indication of the great number of possibilities of specific variations within the scope of the present invention, the inner radii $R_4$, $R'_4$ of lenses $L_2$, $L_3$ are shown to be equal and separated by a small air gap only, in order to indicate that these two lenses can be cemented together to form one lens member.

*Numerical example*

[$f=100$ mm.    Relative aperture: 1:2.3]

| | | | |
|---|---|---|---|
| $R_1 =+ 43.597$ | $d_1= 4.33$ | $n_1=1.6676$ | $V_1=41.9$ |
| $R_2 =+103.826$ | $a_1= 0.19$ | air | |
| $R_3 =+ 30.103$ | $d_2= 9.14$ | $n_2=1.7015$ | $V_2=41.1$ |
| $R_4 =+113.560$ | $a_2= 0.04$ | air | |
| $R'_4=+113.560$ | $d_3= 3.46$ | $n_3=1.7552$ | $V_3=27.5$ |
| $R_5 =+ 19.251$ | $a_3=21.198$ | air | diaphragm space |
| $R_6 =- 21.522$ | $d_4= 2.16$ | $n_4=1.5625$ | $V_4=42.8$ |
| $R_7 =- 29.051$ | $a_4= 0.04$ | air | |
| $R_8 =-133.027$ | $d_5= 9.19$ | $n_5=1.6785$ | $V_5=55.5$ |
| $R_N \begin{cases} R_9 =- 21.349 \\ R'_9=- 21.349 \end{cases}$ | cemeted | | |
| $R_{10}=- 37.551$ | $d_6= 3.03$ | $n_6=1.5695$ | $V_6=49.2$ |

The paraxial intersectional width of the objective amounts to $s'_0=69.66$ mm. for yellow light.

Furthermore, $n_5=1.6785$, i. e. distinctly higher than 1.6650. As the objective has an equivalent focal length of 100 mm., its equivalent refractive power is $$\frac{1000}{100}=10 \text{ dptr.}$$

The surface refractive power of radius of curvature $R_9$ for the yellow light of the helium spectrum, amounts according to the above formula in column 2 to 678.50:21.349=31.781, i. e. 3.178 times the equivalent refractive power of the total objective and is thus in the range of 1.5 to 4.5 times said value.

The sequence of refractive power values according to the present invention shows a distribution of the surface refractive powers within the objective system in such manner that the sum of the surface refractive forces, expressed in per cent of the equivalent refractive power of the total objective, is in the following ranges for the individual members of the objective:

Member I, between $+60\%$ and $+120\%$
Member II, between $-100\%$ and $-200\%$
Member III, between $-40\%$ and $-100\%$
Member IV, between $+100\%$ and $+200\%$ of the equivalent total refractive power of the entire system, which, in the above example, has a focal length of $f=100$ mm. and an equivalent total refractive power of $+10.0$ dptr.

In addition to the above sequence of refractive power values, the constructive design of the system according to the present invention can be also characterized by the radii of curvature of the lens surfaces and it is characterized in its structural design by the following values:

$$I \begin{cases} 30\% f < +R_1 < 60\% f \\ 60\% f < +R_2 < 180\% f \end{cases} L_1$$

$$II \begin{cases} 20\% f < +R_3 < 40\% f \\ 40\% f < +R_4 < 240\% f \\ 40\% f < +R'_4 < 240\% f \\ 12\% f < +R_5 < 30\% f \end{cases} \begin{matrix} L_2 \\ L_3 \end{matrix}$$

$$III \begin{cases} 14\% f < -R_6 < 34\% f \\ 18\% f < -R_7 < 42\% f \end{cases} L_4$$

$$IV \begin{cases} 50\% f < \pm R_8 < \infty \\ 14\% f < -R_9 < 34\% f \\ 14\% f < -R'_9 < 34\% f \\ 25\% f < -R_{10} < 55\% f \end{cases} \begin{matrix} L_5 \\ L_6 \end{matrix}$$

In member III, $R_6$ is numerically smaller than $R_7$.

A preferred embodiment of my invention has been described, but numerous changes, omissions, additions and substitutions can be made without departing from its scope.

What is claimed is:

1. An optical objective system of the modified Gauss-type, of high light-transmitting capacity and anastigmatic image flatness, comprising a <u>diaphragm enclosed by</u> two groups of lenses in such manner that in the front half of the objective on the side of the major conjugate, as well as in the rear half of the objective on the side of the minor conjugate, a simple, uncemented meniscus-shaped individual lens is followed, in the direction of light from object to image, by a composite lens group of opposite power; the rear half of the optical system, following the diaphragm in the direction of light, comprising an inner and an outer meniscus-shaped diverging lens which are concave toward the diaphragm and enclose a collecting lens of unequal curvature, said collecting lens and the meniscus-shaped diverging lens following it in the direction of light, having a pair of adjacent strongly curved surfaces, which is likewise concave toward the diaphragm and is of collecting equivalent refractive power; said collecting lens of unequal curvature consisting of glass, the refractive index of which for yellow light of d-line of the helium spectrum is higher than 1.6650 and, simultaneously, the collective surface refractive power of its surface adjacent the outer meniscus-shaped lens when in contact with air, is in the range of 1.5 to 4.5 times of the equivalent refractive power of the complete optical system, said surface refractive power being referred to the surrounding air on the one hand, and said yellow light of the helium spectrum on the other hand.

2. An optical system as claimed in claim 1, in which, in the rear half of the optical system the pair of adjacent surfaces of the collecting lens of unequal curvature and the outer meniscus-shaped diverging lens, consists of a strongly curved cemented surface which is concave toward the diaphragm.

3. An optical system as claimed in claim 1, in which, in the front half of the system, the composite lens group following the meniscus-shaped individual lens, is a cemented lens.

4. An optical objective system of the modified Gauss-type, of high light-transmitting capacity, according to claim 1, in which the surface refractive powers are distributed within the objective system in such manner that the sum of the surface refractive powers of the individual members of the objective, expressed in per cent of the equivalent refractive power of the total objective, is in the following ranges:

Member I, between +60% and +120%
Member II, between −100% and −200%
Member III, between −40% and −100%
Member IV, between +100% and +200% of the equivalent total refractive power of the entire objective system.

5. An optical objective system of the modified Gauss-type, of high light-transmitting capacity according to claim 1, in which the radii of curvature of the lens surfaces have the following values:

$$I \begin{cases} 30\% f < +R_1 < 60\% f \\ 60\% f < +R_2 < 180\% f \end{cases} L_1$$

$$II \begin{cases} 20\% f < +R_3 < 40\% f \\ 40\% f < +R_4 < 240\% f \\ 40\% f < +R'_4 < 240\% f \\ 12\% f < +R_5 < 30\% f \end{cases} \begin{matrix} L_2 \\ \\ L_3 \end{matrix}$$

$$III \begin{cases} 14\% f < -R_6 < 34\% f \\ 18\% f < -R_7 < 42\% f \end{cases} L_4$$

$$IV \begin{cases} 50\% f < \pm R_8 < \infty \\ 14\% f < -R_9 < 34\% f \\ 14\% f < -R'_9 < 34\% f \\ 25\% f < -R_{10} < 55\% f \end{cases} \begin{matrix} L_5 \\ \\ L_6 \end{matrix}$$

$R_6$ in member III being numerically smaller than $R_7$, wherein ($R_1$ to $R_{10}$) = the radii of the refracting surfaces (1 to 10), (f) = the focal length of the total objective, ($N_1$ to $N_6$) = the refractive index of the lenses ($L_1$ to $L_6$), (V) = the respective Abbe numbers of the several lens materials having refractive indices ($N_1$ to $N_6$), and ($L_1$ to $L_6$) = the respective lens elements in the lens groups (I to IV).

6. An optical objective system of the modified Gauss-type, of high light-transmitting capacity according to claim 1, in which the structural design of the lens members forming the objective meets the following conditions:

| In the front part of the objective: | | | |
|---|---|---|---|
| $I \begin{cases} R_1 = +0.4 \times f \\ R_2 = +1.0 \times f \end{cases}$ | $n_1 = 1.67$ | $V_1 = 42$ | $L_1$ |
| $II \begin{cases} R_3 = +0.3 \times f \\ R_4 = +1.1 \times f \\ R'_4 = +1.1 \times f \\ R_5 = +0.2 \times f \end{cases}$ | $n_2 = 1.70$ | $V_2 = 41$ | $L_2$ |
| | $n_3 = 1.75$ | $V_3 = 27$ | $L_3$ |
| In the rear part of the objective: | | | |
| $III \begin{cases} R_6 = -0.2 \times f \\ R_7 = -0.3 \times f \end{cases}$ | $n_4 = 1.56$ | $V_4 = 43$ | $L_4$ |
| $IV \begin{cases} R_8 = -1.3 \times f \\ R_9 = -0.2 \times f \\ R'_9 = -0.2 \times f \\ R_{10} = -0.4 \times f \end{cases}$ | $n_5 = 1.68$ | $V_5 = 55$ | $L_5$ |
| | $n_6 = 1.57$ | $V_6 = 49$ | $L_6$ | wherein ($R_1$ to $R_{10}$) = the radii of the refracting surfaces (1 to 10), (f) = the focal length of the total objective, ($N_1$ to $N_6$) = the refractive index of the lenses ($L_1$ to $L_6$), (V) = the respective Abbe numbers of the several lens materials having refractive indices (($N_1$ to $N_6$), and ($L_1$ to $L_6$) = the respective lens elements in the lens groups (I to IV).

References Cited in the file of this patent

UNITED STATES PATENTS

| Number | Name | Date |
|---|---|---|
| 2,164,028 | Berek | June 27, 1939 |
| 2,171,641 | Berek | Sept. 5, 1939 |

FOREIGN PATENTS

| Number | Country | Date |
|---|---|---|
| 428,657 | Germany | May 10, 1926 |
| 427,008 | Great Britain | Apr. 12, 1935 |
| 665,520 | Germany | Sept. 27, 1938 |